United States Patent [19]
Ohya et al.

[11] 4,127,707
[45] Nov. 28, 1978

[54] STORAGE BATTERY

[75] Inventors: Tokuji Ohya; Toshihiro Isoi, both of Takatsuki, Japan

[73] Assignee: Yuasa Battery Company Limited, Takatsuki, Japan

[21] Appl. No.: 851,772

[22] Filed: Nov. 15, 1977

[30] Foreign Application Priority Data

Sep. 24, 1977 [JP] Japan .............................. 52/114895

[51] Int. Cl.² ............................................. H01M 2/30
[52] U.S. Cl. .................................... 429/149; 429/181
[58] Field of Search ............... 429/180, 181, 182, 184, 429/149

[56] References Cited

U.S. PATENT DOCUMENTS 1,942,350 1/1934 Appel et al. ........................ 429/181
2,205,992 1/1940 Phillips ................................ 429/186

FOREIGN PATENT DOCUMENTS 570,439 4/1924 France ..................................... 429/181

Primary Examiner—Donald L. Walton
Attorney, Agent, or Firm—Watson, Cole, Grindle & Watson

[57] ABSTRACT

This invention relates to storage batteries and more particularly to a storage battery having an improved terminal construction in which a cover and a synthetic resin portion surrounding a terminal post are best sealed together, the post passing through an opening in the cover and being electrically connected with a positive and negative plate group located in the battery container. The synthetic resin portion has a dish-shaped section with an upwardly open cavity, and has projections for the reception within recesses provided in ribs located on the inner wall and on the partition wall of the container. Thus, a storage battery is provided which avoids leakage of electrolyte from the terminal, is high in performance, is long lasting, easy to make, adapted for mass production and is economical.

3 Claims, 6 Drawing Figures

STORAGE BATTERY

BACKGROUND OF THE INVENTION

1. Field of the Invention

The present invention relates to storage batteries and more particularly to a storage battery having an improved terminal construction.

2. Description of the Prior Art

A storage battery terminal construction has been developed wherein the post extends through a cover opening having a lead bushing welded to the post, a terminal being formed in the upper portion of the post with the use of a jig. However, because of such a welding requirement, a clearance is often produced by the difference in the coefficient of expansion between the cover and lead bushing due to heat. The electrolyte in the battery is therefore capable of leaking out through such clearance so as to prematurely corrode the external cable fitted to the storage battery. Moreover, the welding operation, the formation of the terminal and the use of the lead bushing are troublesome during manufacture of the battery and result in increased production costs.

SUMMARY OF THE INVENTION

The storage battery of the present invention is designed to eliminate the defects in the assembly and manufacture of prior art storage batteries.

An object of the present invention is therefore to provide a storage battery which is high in performance and is long lasting.

Another object of the present invention is to provide a storage battery which positively prevents the electrolyte from leaking out through the terminal.

A further object of the present invention is to provide a storage battery which is economical, easy to make and is capable of being mass produced.

BRIEF DESCRIPTION OF THE DRAWINGS

The present invention can be more readily understood from the following description with reference to the accompanying drawings in which.

DETAILED DESCRIPTIONS OF PREFERRED EMBODIMENTS

Figure 1:
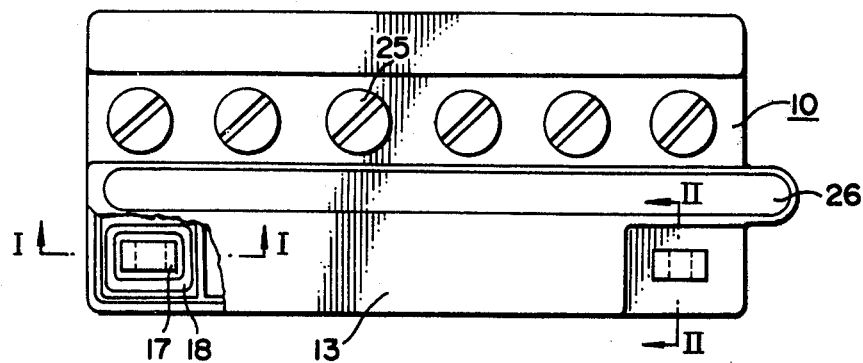
FIG. 1 is a top plan view of a storage battery according to the present invention.
Figure 2:
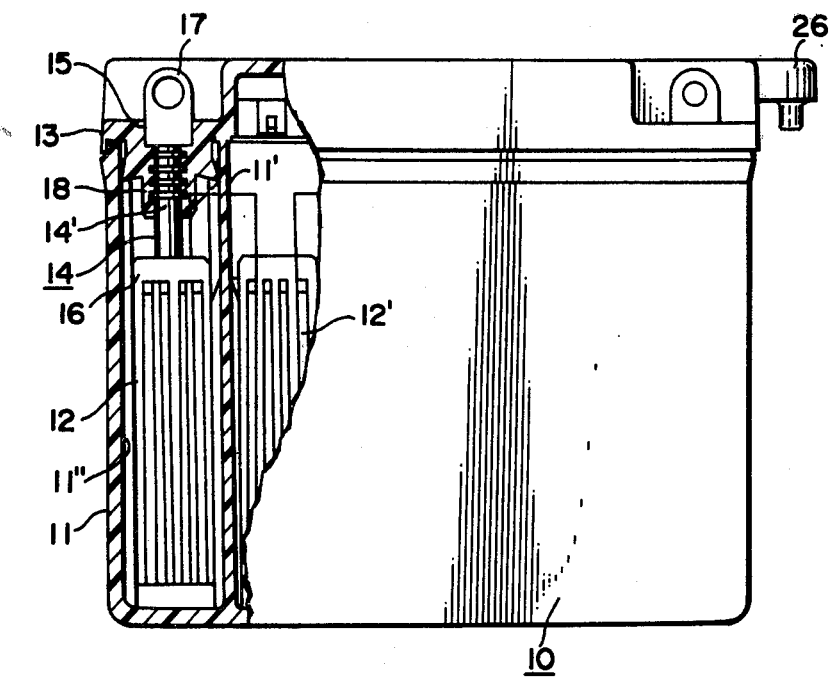
FIG. 2 is a side elevational view partially sectioned substantially along line 2—2 of FIG. 1.
Figure 3:
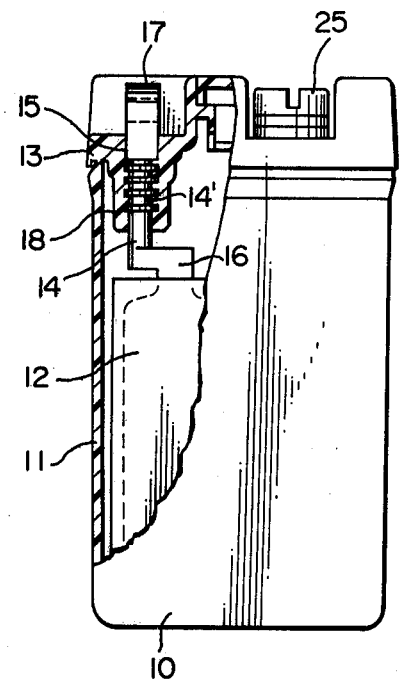
FIG. 3 is an end elevational view partially sectioned substantially along line 3—3 of FIG. 1.
Figure 4:
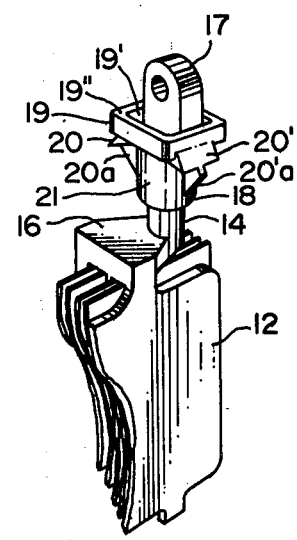
FIG. 4 is a perspective view of a terminal post connected with a plate group and having a synthetic resin portion in the storage battery of the present invention.
Figure 5:
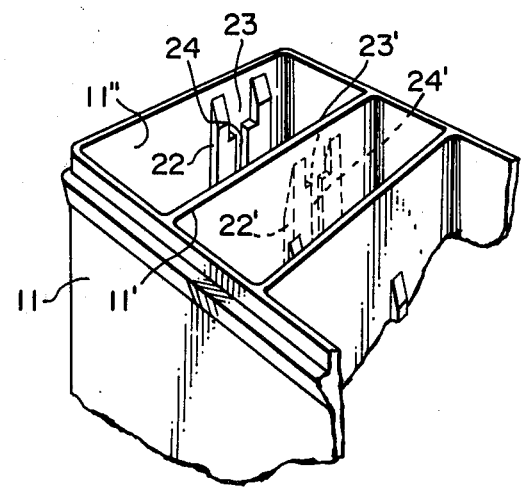
FIG. 5 is a perspective view of a part of a container having ribs forming recesses at the upper ends on the side wall and on the partition wall in the storage battery of the present invention.

In the drawings, reference numeral 10 indicates a storage battery of the present invention having a plurality of cells defined by battery container 11 and one or more partition walls 11'. The end cells contain positive and negative plate groups 12, and the intermediate cells contain positive and negative plate groups 12'. The cells are electrically connected with each other and are fitted with a cover 13 to assemble the storage battery 10 as in a well known manner. Terminal posts 14 of the end cells extend through cover openings 15, are electrically connected at their lower ends with straps 16 of their respective positive and negative plate groups 12, and are each connected at their upper ends with a terminal 17 to which an external cable (not shown) is connected. A synthetic resin portion 18 surrounds the intermediate portion of each post. Each post has flanges 14' for anchoring portion 18 to the intermediate portion thereof, each portion 18 including a dish-shaped element 19 having an upwardly open cavity 19' in the upper portion thereof and a tubular portion 21 having projections 20 and 20' extending outwardly of opposite lower edges of element 19.

Ribs 22 and 22' are respectively formed on an inner surface 11" of wall 11 and on the inner surface of partition walls 11' of each of the end cells. Recesses 23 and 23' are formed at the upper ends of confronting ribs in the end cells for the reception of projections 20 and 20'. Further, ribs 22 and 22' are respectively formed in pairs having clearances 24 and 24' between them so that small gussets or pendants 20a and 20'a depending from projections 20 and 20' of portion 18 may be respectively inserted into clearances 24 and 24' so as to facilitate, together with the recesses of the ribs, the setting of the terminal posts in a fixed position within the container.

The cover 13 is provided with an electrolyte port plug 25 for each cell and an elbow 26 for removing all the gases generated from the respective cells.

The first feature of the present invention is that the synthetic resin portion 18 of each terminal post 14 and the cover 13 are heat-sealed together. That is to say, the upper edge 19" of dish-shaped element 19 of portion 18 and the lower surface 13' of cover 13 are heat-sealed together. As a result, the electrolyte is positively prevented from leaking out through cover opening 15 through which the terminal post 14 extends. With such a terminal construction, not only is the electrolyte also prevented from leaking out but also the manufacturing problems of sealing the post with the lead bushing are avoided and the forming of the terminal by using a jig is not required. And, since a lead bushing is not used, the manufacturing operation is simplified and the cost is kept low.

The second feature of the present invention relates to cavity 19'. When upper edge 19" of element 19 and lower surface 13' of cover 13 are heat-sealed together as described above, some molten synthetic resin will remain in cavity 19' and will not leak out through the cover opening 15 to impair appearance of storage battery 10.

The third feature of the present invention relates to the provision of recesses 23 and 23' respectively formed at the upper ends of ribs 22 and 22' which are located respectively on inner surface 11" the confronting surface of partition wall 11' in each end cell of container 11 for the reception of projections 20 and 20' of synthetic resin portion 18 respectively in recesses 23 and 23'. Such arrangement provides an advantage whereby each terminal post 14 can be set in a fixed position within the container. Further, with the provision of clearances 24 and 24', small gussets or pendants 20a and 20a' may be respectively guided into these clearances for more positively setting the terminal posts in place.

The advantage of setting the terminal post in a fixed position is that, lower surface 13' and the upper edge 19" may be easily heat-sealed together without slippage and without the need to adjust for such slippage. A construction capable of mass-production is thus provided.

The fourth feature of the present invention is that the container 11, cover 13 and the synthetic resin portion 18 of the terminal post 14 are made of the same material which is a thermoplastic synthetic resin light in weight and high in tensile strength and shock-proofness for storage batteries. It is preferably a polyolefin thermoplastic material such as, for example, a polypropylene or polyethylene. Particularly the polypropylene has a high shock-proofness and is an optimum material for storage batteries.

Figure 6:
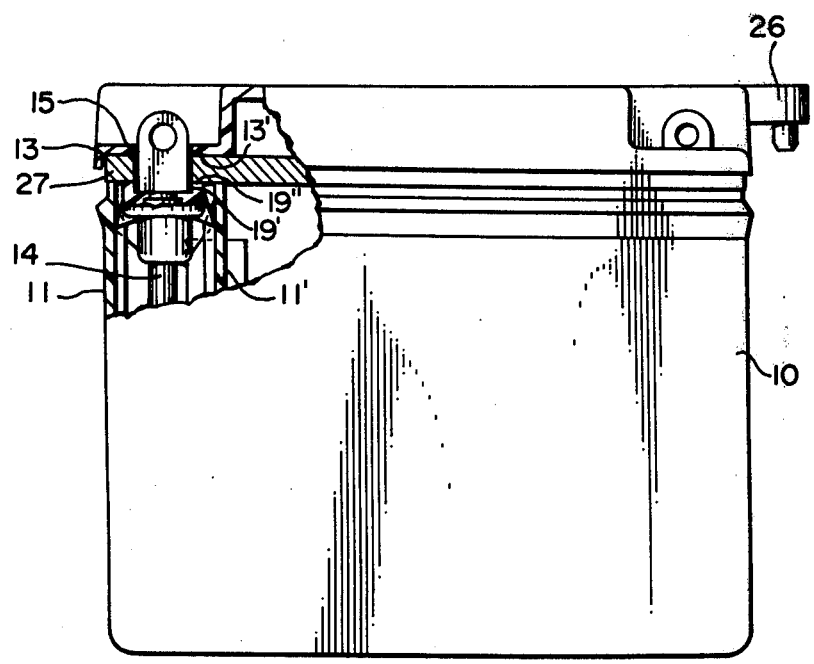
FIG. 6 is a view similar to FIG. 2 except that a heating plate is disposed between the container and cover.

The container, cover and the synthetic resin portion of the terminal post are formed of the same material and can be therefore heat-sealed under the same conditions such as heating temperature and time. As shown in FIG. 6, a heating plate 27 is fitted between the container or the synthetic resin portion of the terminal post and the cover to heat them to a fusing temperature. When heating plate 27 is then removed and the container or the synthetic resin portion of the terminal post and the cover are pressed into contact with each other, they will be heat-sealed together. As they are thus heat-sealed together, the electrolyte within the storage battery will be positively prevented from leaking out.

Thus the storage battery of the present invention is formed of a terminal construction provided with several features described above. As a result, a storage battery is obtained which is leak proof, high in performance, long lasting, easy to make, capable of being mass produced and economical in cost.

Obviously, without deviating from the spirit of the present invention, various alterations and modifications are possible and the invention is not limited to the specifically described embodiments.

For example, the upper portion of the synthetic resin portion of the terminal post need not be bowl-shaped but may be cylindrical. The ribs provided on the inner confronting walls of the end cells need not be vertical but may be horizontal.

What is claimed is:

1. A storage battery, comprising, a container of synthetic resin material, said container having at least one partition wall dividing it into at least a pair of cells, positive and negative battery plate groups located in said cells, a cover of synthetic resin material enclosing said cells, said cover having openings therein overlying said cells, terminal posts connected to said plate groups extending outwardly through said openings, portions of synthetic resin material surrounding said posts and being positively secured thereto, said portions each including a dish-shaped element having an upwardly open cavity surrounding each of said openings, an upper surface of each said cavity being heat sealed to a lower surface of said cover, whereby said cavity of each said dish-shaped element receives a portion of synthetic resin material upon heat sealing said surfaces together, the battery thereby being rendered substantially leak proof, ribs provided on confronting inner surfaces of said cells, said ribs having recesses at upper ends thereof, and opposed projections provided on said portions for the reception in said recesses to facilitate a positive setting of said posts in said cells.

2. The battery according to claim 1, wherein said resin material is a polyolefin thermoplastic resin.

3. The battery according to claim 1, wherein said resin material is polypropylene.

* * * * *